3,300,475
LINCOSAMINE AND CELESTOSAMINE DERIVATIVES AND PROCESS FOR PREPARING SAME
Brian Bannister, Kalamazoo, Mich., assignor to The Upjohn Company, Kalamazoo, Mich., a corporation of Delaware
No Drawing. Filed June 30, 1965, Ser. No. 468,617
25 Claims. (Cl. 260—210)

This application is a continuation-in-part of application Serial No. 375,300, filed June 15, 1964, now abandoned.

This invention relates to novel compounds and is particularly concerned with methyl β-thiolincosaminide (VIIa, R=H) [methyl 6-amino - 6,8-dideoxy - 1 - thio-D-erythro-β-D-galacto-octopyranoside] and methyl β-thio-celestosaminide (VIIIb) [methyl 6-amino 7-O-methyl-6,8-dideoxy - 1-thio-D-erythro - β-D-galacto - octopyranoside]; the N-acyl-1,2,3,4,7-penta-O-acyl-α- and β-lincosamine (IIIa and IIIb, $R_3$=Ac), N-acyl-1,2,3,4-tetra-O-acyl-7-O-methyl-α- and β-celestosamine (IIIc and IIId, $R_3$=methyl), N-acyl - 2,3,4,7-tetra-O-acyl - 1α-bromo-1-deoxylincosamine (IVa, $R_3$=Ac) and -celestosamin (IVb, $R_3$=$CH_3$), produced in the process thereof.

The novel compounds of this invention and the process for the production thereof can be illustratively represented by the following sequence of formulae:

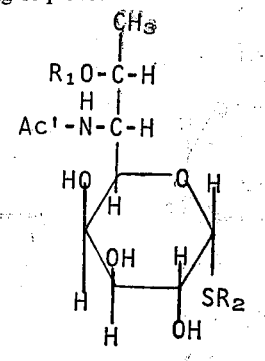

(1)

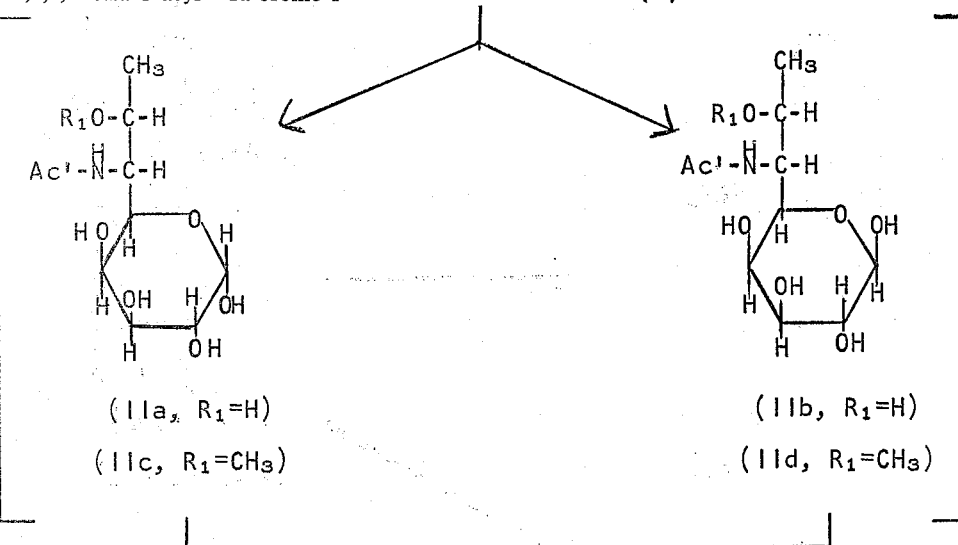

(IIa, $R_1$=H)
(IIc, $R_1$=$CH_3$)

(IIb, $R_1$=H)
(IId, $R_1$=$CH_3$)

(111a, $R_3$=Ac)
(111c, $R_3$=$CH_3$)

(111b, $R_3$=Ac)
(111d, $R_3$=$CH_3$)

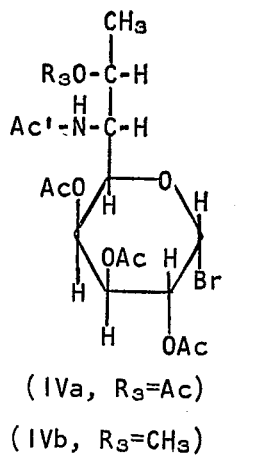

(IVa, R₃=Ac)

(IVb, R₃=CH₃)

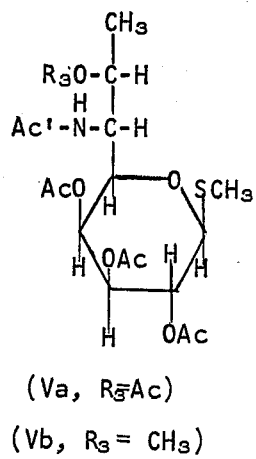

(Va, R₃=Ac)

(Vb, R₃=CH₃)

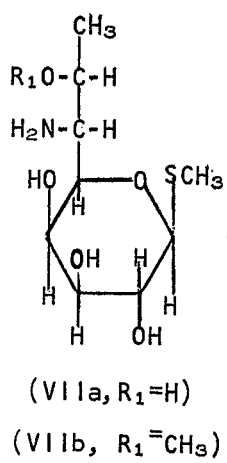

(VIIa, R₁=H)

(VIIb, R₁=CH₃)

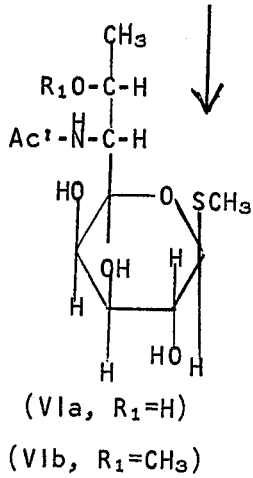

(VIa, R₁=H)

(VIb, R₁=CH₃)

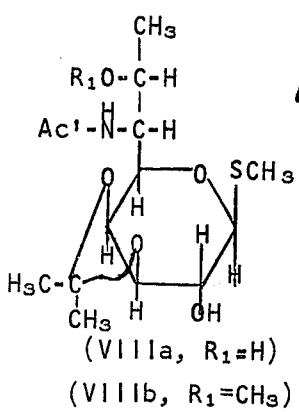

(VIIIa, R₁=H)

(VIIIb, R₁=CH₃)

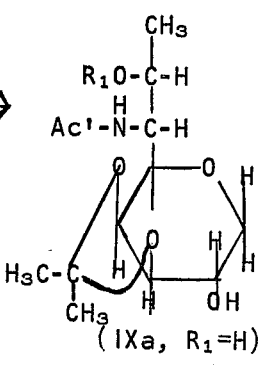

(IXa, R₁=H)

(IXb, R₁=CH₃)

wherein Ac and Ac' are the acyl radicals of hydrocarbon carboxylic acids containing from 2 to 12 carbon atoms, inclusive, wherein $R_1$ is selected from the group consisting of hydrogen and methyl, wherein $R_2$ is selected from the group of methyl and 2-hydroxyethyl and wherein $R_3$ is selected from the group consisting of methyl and Ac, defined as above.

The process of the present invention comprises: treating methyl N-acyl-α-thiolincosaminide or 2-hydroxyethyl-N-acyl-α-thiocelestosaminide (I) with mercuric chloride in a warm aqueous solution to obtain a mixture of N-acyl-α- lincosamine (IIa) and N-acyl-β-lincosamine (IIb) or N-acyl-α-celestosamine (IIc) and N-acyl-β-celestosamine (IId); acylating this mixture with an acylating reagent selected from acyl halides and acid anhydrides of hydrocarbon carboxylic acids containing from 2 to 12 carbon atoms, inclusive, to obtain a mixture of N-acetyl-1,2,3,4,7-penta-O-acyl-α- and β-lincosamine (IIIa and IIIb) or N-acetyl-1,2,3,4-tetra-O-acyl-α- and β-celestosamine (IIIc and IIId); treating compounds IIIa or IIIb or a mixture of compounds IIIa and IIIb or IIIc or IIId or a mixture of IIIc and IIId with hydrogen bromide in acetic acid to obtain N-acyl-2,3,4,7-tetra-O-acyl-1-α-bromo-1-deoxylincosamine (IV or N-acyl-2,3,4,-tri-O-acyl-1-α-bromo-1-deoxycelestosamine (IVb)); treating compound IV successively with thiourea, potassium carbonate, sodium bisulfite, and methyl iodide to obtain methyl N-acyl-2,3,4,7-tetra-O-acyl-β-thiolincosaminide (Va, R₃=acyl) or methyl N-acyl-2,3,4-tri-O-acyl-β-thiocelestosaminide (Vb, R₃=CH₃)

treating compounds Va or Vb with dry ammonia gas in methanol to obtain methyl N-acyl-β-thiolincosaminide (VIa, R₁=H) or N-acyl-β-thiocelestosaminide (VIb, R₁=CH₃). Hydrazinolysis of compound VI or of compound V gives methyl β-thiolincosaminide (VIIa, R=H) or methyl β-thiocelestosaminide (VIIb, R₁=CH₃).

The novel polyhydroxy compounds, methyl N-acyl-β-thiolincosaminide (VIa) methyl N-acyl-β-thiocelestosaminide (VIb) methytl β-thiolincosaminide (VIIa) and methyl β-thiocelestosaminide (VIIb) can be reacted with isocyanates to form urethanes and ureas, and can be used to modify polyurethane resins. For example, these compounds can be reacted with an excess of toluene di-isocyanate to form a prepolymer which can be reacted with polyol ethers and polyol esters, commonly used to form polyurethanes; alternately, these compounds can be mixed with polyol compounds and the mixture then reacted with toluene di-isocyanate. Compounds VIa, VIb, VIIa and VIIb can also be reacted with ethylene oxide, propylene oxide and like alkylene oxides to form methyl polyoxalkylene N-acyl-β-thiolincosaminide polyoxyalkylene, methyl β-thiolincosaminide N-acyl-β-thiocelestosaminide and polyoxyalkylene methyl β-thiocelestosaminide, which can be reacted with toluene di-isocyanate to form polyurethanes. Compounds VIa, VIb, VIIa and VIIb are particularly useful for producing rigid polyurethane foams. Compounds VIIa and VIIb also can condense with formaldehyde, especially when the thiocyanic acid addition salt is employed, to form polymers according to U.S. Patents 2,425,320 and 2,606,155, which are useful as pickling inhibitors.

The fluorsilicic acid addition salts of methyl β-thiolincosaminide and methyl β-thiocelestosaminide are also useful as mothproofing agents in accordance with U.S. Patents 2,915,334 and 2,075,359.

The methyl N-acyl-β-thiolincosaminides of Formula VIa can furthermore be treated with acetone in the presence of sulfuric acid to form the methyl N-acyl-3,4-O-isopropylidene-β-thiolincosaminide (VIIIa) which can be desulfurized with Raney nickel in ethanol to N-acyl-3,4,O-isopropylidene - 1 - deoxylincosamine (IXa). N - acyl-β-thiolincosaminide (VIa) can also be converted to N-acyl-3,4,O-isopropylidene-7-O-methyl-1,5-anhydrolincosaminol
(N-acyl-3,4-O-isopropylidene-7-O-methyl-1-deoxylincosamine
N-acyl-3,4-O-isopropylidene-1-deoxycelestosamine)

(IXb) by desulfurizing VIIIa with Raney nickel to obtain the aforementioned N-acyl-3,4-isopropylidene-1-deoxylincosamine and methylating the latter with methyl iodide in the presence of a base such as sodamide, potassium tert-butoxide, or the like.

In the same manner VIb can be converted to N-acyl-3,4-O-isopropylidene-β-thiocelestosaminide VIIIb with acetone in the presence of sulfuric acid, which can be desulfurized with Raney nickel in ethanol to give N-acyl-3,4 - O - isopropylidene - 7 - O - methyl - 1,5 - anhydrolincosaminol identical with N-acyl-3,4-O-isopropylidene-1-deoxycelestosamine (IXb). This compound (IXb) is active against a number of microorganisms, such as *Trichophyton rubrum, Pseudomonas fluorescens*, and others. The anti-microbial activity of this compound can be utilized for washing equipment in hospitals and homes and for washing medical and surgical instruments as well as clothing used in laboratories specializing in the cultivation of microorganizms. Also, it can be used to wash floors, walls and ceilings in locations where sterile backgrounds are necessary.

The following preparations and examples are illustrative of the process and products of the present invention, but are not to be construed as limiting.

EXAMPLE 1.—N - ACETAL-1,2,3,4,7-PENTA-O-ACETYL-α-LINCOSAMINE AND N-ACETYL-1,2,3,4,7-PENTA-O-ACETYL-β-LINCOSAMINE

A. *Methyl α-thiolincosaminide*

A solution of 4 g. of lincomycin (U.S. Patent 3,086,912) in 20 ml. of hydrazine hydrate (98–100%) was refluxed for 21 hours; excess hydrazine hydrate was then removed in vacuo under nitrogen at steam bath temperature. The residue, a pasty mass of crystals, was cooled, acetonitrile was added, and the mixture was stirred until the crystals were suspended. The crystals were collected on a filter, washed with acetonitrile and with ether. The yield of white, crystalline methyl α-thiolincosaminide after drying in vacuo at room temperature was 2.1 g. (84%). Recrystallization was accomplished by dissolving the methyl α-thiolincosaminide in hot dimethylformamide and adding an equal volume of ethylene glycol dimethyl ether.

Methyl α-thiolincosaminide has a melting point of 225–228° C., an optical rotation of $[\alpha]_D^{25}$ +276° (c., 0.768, water), and a pKa' of 7.45.

*Analysis.*—Calcd. for $C_9H_{19}NO_5S$: C, 42.7; H, 7.56; N, 5.53; S, 12.66. Found: C, 42.6; H, 7.49; N, 5.75; S, 12.38.

B. *Methyl N-acetyl-α-thiolincosaminide*

Five grams of methyl α-thiolinocosaminide (about 0.02 mole) was suspended with stirring in 50 ml. of methanol and treated with 4.04 g. (about 0.04 mole) of acetic anhydride. The starting material dissolved almost completely, and thereafter the mixture became solid. After 18 hours at room temperature (about 25° C.), the solid was filtered, washed with methanol, and dried in a vacuum oven at 50° C. and 15 mm. pressure; yield, 4.58 g. (79%) of crystalline product melting at 242–245° C. This product was recrystallized from absolute methanol to give colorless needles of methyl N-acetyl-α-thiolincosaminide having a melting point of 243–245° C. and a rotation of $[\alpha]_D^{25}$ +265° (c., 0.7374, water).

*Analysis.*—Calcd. for $C_{11}H_{21}NO_6S$: C, 44.72; H, 7.17; N, 4.74; S, 10.85. Found: C, 44.87; H, 7.10; N, 4.65; S, 10.99.

C. *Mixture of 6-acetamido-6,8-dideoxy-D-erythro-α- and β-D-galacto-octopyranose (N-acetyl-α- and β-lincosamines) (IIa and IIb, respectively, when Ac'=acetyl)*

A solution of 50 g. of methyl N-acetyl-α-thiolincosaminide in 1500 ml. of water at 40° C. was stirred magnetically and treated with a solution of 70 g. of mercuric chloride in 1500 ml. of water at 40° C.; a white precipitate formed immediately. The reaction was continued with occasional heating to 40° C. for a period of 3 days. Thin-layer chromatography then showed the absence of starting material. The precipitate of mercuric chloride methyl mercaptide (ClHgSMe) was removed by filtration. The colorless filtrate, together with aqueous washes of the precipitate, was stirred magnetically at room temperature, and the excess of mercuric chloride was removed by the addition of pyridine in small portions until the precipitation of the insoluble mercuric chloride-pyridine complex was complete. After storing the mixture in the refrigerator at 0° for 3 hours, the solid was removed by filtration, the precipitate was washed well with cold water, and the combined filtrate and washings were stirred with a small amount of silver carbonate until the solution was neutral to pH paper. The solution was thereupon filtered through a "Millipore" filter (Millipore Filter Corporation, Bedford, Massachusetts), the filter was washed thoroughly with water;

and the washings were added to the colorless filtrate. Excess silver ion was precipitated by saturating the solution with hydrogen sulfide and removing the silver sulfide by filtration. The silver sulfide was washed with water, the washings were added to the filtrate, and the solution was lyophilized to give a colorless amorphous solid, which was a mixture of 6-acetamido-6,8-dideoxy-D-erythro-α- and β-D-galacto-octopyranoses (N-acetyl-α-lincosamine and N-acetyl-β-lincosamine).

D. *N-acetyl-1,2,3,4,7-penta-O-acetyl-β-lincosamine*

The crude mixture of N-acetyl-α-lincosamine and N-acetyl-β-lincosamine was slurried in 400 ml. of pyridine and 200 ml. of acetic anhydride and stirred magnetically overnight at room temperature. The resulting colorless solution was concentrated on a rotating evaporator at 40° C. and 1 mm. Hg pressure to a pale yellow syrup which was dissolved in a mixture of water and chloroform. The aqueous layer was extracted with chloroform and the chloroform extracts were combined, washed with dilute sulfuric acid (2 N), then twice with water, with saturated aqueous sodium bicarbonate, with water until neutral, and finally dried over anhydrous sodium sulfate. The resulting chloroform extract was then evaporated in a rotating evaporator at 35° C. and 15 ml. Hg pressure to give a colorless solid which was dissolved in hot ethyl acetate. To this ethyl acetate solution was added Skellysolve B hexanes until solids began to crystallize. The solids were removed by filtration and twice recrystallized from ethyl acetate-Skellysolve B hexanes to give N-acetyl-1,2,3,4,7-penta-O-acetyl-β-loncosamine (9.27 g.) of melting point 227–230° C. and rotation $[\alpha]_D^{25}$ +33° (c., 0.832, chloroform).

*Analysis.*—Calcd. for $C_{30}H_{29}NO_{12}$: C, 50.52; H, 6.15; N, 2.95. Found: C, 50.40; H, 6.42; N, 3.04.

The ethyl acetate-Skellysolve B hexanes filtrates from the first crystallization were allowed to stand at room temperature, whereupon colorless pirsmatic needles of N-acetyl-1,2,3,4,7-penta-O-acetyl-α-lincosamine separated; M.P. 169–172° C. The melt resolidified on cooling in the form of hexagonal platelets which then melted at 237–238° C.; after recrystallization from ethyl acetate-Skellysolve B hexagonal platelets were obtained melting at 240–240.5° C. and having a rotation of $[\alpha]_D^{25}$ +132° (c., 0.9842, chloroform).

*Analysis.*—Calcd. for $C_{20}H_{29}NO_{12}$: C, 50.52; H, 6.15; N, 2.95. Found: C, 50.62; H, 6.08; N, 3.02.

The N-acetyl-1,2,3,4,7-penta-O-acetyl-α- and β-lincosamines can also be separated by counter current distribution, using a system of water:acetone:methyl ethyl ketone:cyclohexane in a volume ratio of 3:5:4:4. In 900 transfers, approximately 50% of each of the two epimers could be isolated in the pure state, the partition coefficients being for the α-epimer, 0.75; for the β-epimer, 0.66.

EXAMPLE 2.—N-ACETYL-1,2,3,4,7-PENTA-O-PROPIONYL-α- AND β-LINCOSAMINES

In the manner given in Example 1–D, a mixture of N-acetyl-α- and β-lincosamines were treated with propionic anhydride in pyridine to give a mixture of N-acetyl-1,2,3,4,7-penta-O-propionyl-α- and β-lincosamines, which could be separated by counter current distribution using a suitable solvent system such as water, acetone, methyl ethyl ketone and cyclohexane.

EXAMPLE 3.—N-PROPIONYL-1,2,3,4,7-PENTA-O-VALERYL-α- AND β-LINCOSAMINES

In the manner given in Example 1–B, methyl α-thiolincosaminide was treated with propionic anhydride to give methyl N-propionyl-α-thiolincosaminide.

Methyl N-propionyl-α-thiolincosaminide was treated as in Example 1–C with mercuric chloride and hot water to give N-propionyl-α- and β-lincosamines.

The mixture of N-propionyl-α- and -β-loncosamines was treated as in Example 1–D with valeric anhydride in pyridine solution to give a mixture of N-propionyl-1,2,3,4,7-penta-O-valeryl-α- and β-lincosamines, which could be separated by counter current distribution, as also shown in Example 1–D.

EXAMPLE 4.—N-LAUROYL-1,2,3,4,7-PENTA-O-BENZOYL-α- AND β-LINCOSAMINE

In the manner given in Example 1–B, methyl α-thiolincosaminide was reacted with lauric anhydride in methanol to give N-lauroyl-α-thiolincosaminide.

Methyl N-lauroyl-α-thiolincosaminide was reacted, as in Example 1–C, with mercuric chloride in water at 40° C. to give a mixture of N-lauroyl-α- and β-lincosamines.

In the manner given in Example 1–D, N-lauroyl-α- and β-lincosamines were reacted with benzoic anhydride in pyridine to give a mixture of N-lauroyl-1,2,3,4,7-penta-O-benzoyl-α- and β-lincosamines, which are separable by counter current distribution.

In the manner given in Example 1–B through 1–D, other N-acyl-1,2,3,4,7-penta-O-acyl-α- and β-lincosamines can be prepared by acylating methyl α-thiolincosaminide with a selected acid anhydride, treating the thus-obtained methyl N-acyl-α-thiolincosaminide with mercuric chloride to obtain a mixture of N-acyl-α- and β-lincosamines, which is acylated with an acid anhydride to give the corresponding N-acyl-1,2,3,4,7-penta-O-acyl-α- and β-lincosamines, which can be separated from each other through conventional means, such as fractional recrystallization or, preferably, by counter current distribution. Representative compounds thus obtained include: N-acetyl-1,2, 3,4,7-penta-O-hexanoyl-α- and β-lincosamines, N-acetyl-1,2,3,4,7-penta-O-heptanoyl-α- and β-lincosamines, N-acetyl - 1,2,3,4,7 - penta-O-octanoyl-α- and β-lincosamines, N-acetyl-1,2,3,4,7-penta-O-nonanoyl-α- and β - lincosamines, N-acetyl-1,2,3,4,7-penta-O-decanoyl-α- and β-lincosamines, N-acetyl-1,2,3,4,7-penta-O-undecanoyl-α- and β-lincosamines, N-acetyl-1,2,3,4,7-penta-O-lauroyl-α- and β - lincosamines, N - acetyl - 1,2,3,4-7 - penta-O-phenylacetyl-α- and β-lincosamines, N-acetyl-1,2,3,4,7-penta-O-(3-phenylpropionyl)-α- and β-lincosamines, N-(cyclopentanepropionyl) - 1,2,3,4,7 - penta - O - acetyl - α - and -β-lincosamines, N-isovaleryl-1,2,3,4,7-penta-O-octanoyl-α- and β-lincosamines and the like.

EXAMPLE 5.—N-ACETYL-2,3,4,7-TETRA-O-ACETYL-1α-BROMO-1-DEOXYLINCOSAMINE

Two grams of N-acetyl-1,2,3,4,7-penta-O-acetyl-β-lincosamine was stirred magnetically with a solution of anhydrous hydrogen bromide in acetic acid in 5 ml. of acetic acid (saturated at 0°) at room temperature (about 25° C.) for about 3 hours. All of the solids dissolved within one hour. The pale yellow, viscous solution was diluted with 50 ml. of chloroform, poured onto ice and stirred for 10 minutes. The chloroform layer was separated, the aqueous solution was extracted thoroughly with chloroform, and the combined chloroform extracts were washed with water until the aqueous wash was neutral to Congo red paper, and dried over anhydrous sodium sulfate. The chloroform was thereupon evaporated in a rotary evaporator at 35° and 15 mm. Hg pressure to give an almost colorless amorphous solid. After three crystallizations of the solid from chloroform-Skellysolve B, colorless, prismatic needles of N-acetyl-2,3,4,7-tetra-O-acetyl-1α-bromo - 1 - deoxylincosamine were obtained which had a melting point of 188–189° C. and a rotation of $[\alpha]_D^{25}$ +231° (c., 0.8132, chloroform).

*Analysis.*—Calcd. for $C_{18}H_{26}BrNO_{10}$: C, 43.56; H, 5.28; N, 2.82; Br, 16.10. Found: C, 43.68; H, 5.39; N, 2.88; Br, 17.22.

EXAMPLE 6.—N - ACETYL - 2,3,4,7 - TETRA - O - ACETYL - 1α - BROMO - 1 - DEOXYLINCOSAMINE FROM N-ACETYL-1,2,3,4,7-PENTA-O-ACETYL-α-LINCOSAMINE

In the manner given in Example 5-N-acetyl-1,2,3,4-7-penta-O-acetyl-α-lincosamine was treated with hydrogen bromide in acetic acid solution at room temperature for three hours to give N-acetyl-2,3,4,7-tetra-O-acetyl-1α-bromo-1-deoxylincosamine.

In the manner given in Example 5, treatment of a mixture of the α- and β-epimers of N-acetyl-1,2,3,4,7-penta-O-acetyllincosamine with hydrogen bromide gives N-acetyl-2,3,4,7-tetra-O-acetyl-1α-bromo-1-deoxylincosamine.

EXAMPLE 7.—N-ACETYL-2,3,4,7-TETRA-O-PROPIONYL-1α-BROMO-1-DEOXYLINCOSAMINE

In the manner given in Example 5, N-acetyl-1,2,3,4,7-penta-O-propionyl-β-lincosamine was treated with hydrogen bromide in acetic acid to give N-acetyl-2,3,4,7-tetra-O-propionyl-1α-bromo-1-deoxylincosamine.

EXAMPLE 8.—N-PROPIONYL-2,3,4,7-TETRA-O-VALERYL-1α-BROMO-1-DEOXYLINCOSAMINE

In the manner given in Example 5, N-propionyl-1,2,3,4,7-penta-O-valeryl-α-lincosamine was treated with an acetic acid solution saturated with hydrogen bromide to give N-propionyl-2,3,4,7-tetra-O-valeryl-1α-bromo-1-deoxylincosamine.

EXAMPLE 9.—N-LAUROYL-2,3,4,7-TETRA-O-BENZOYL-1α-BROMO-1-DEOXYLINCOSAMINE

In the manner given in Example 5, N-lauroyl-1,2,3,4,7-penta-O-benzoyl-β-lincosamine was treated with an acetic acid solution of hydrogen bromide to give N-lauroyl-2,3,4,7-tetra-O-benzoyl-1α-bromo-1-deoxylincosamine.

In the manner given in Example 5, treating other N-acyl-1,2,3,4,7-penta-O-acyl-α- or β-lincosamines with hydrogen bromide in acetic acid solution gives other N-acyl-2,3,4,7-tetra-O-acyl-1α-bromo-1-deoxylincosamines. Representative compounds thus produced include:

N-acetyl-2,3,4,7-tetra-O-hexanoyl-1α-bromo-1-deoxylincosamine,
N-acetyl-2,3,4,7-tetra-O-heptanoyl-1α-bromo-1-deoxylincosamine,
N-acetyl-2,3,4,7-tetra-O-octanoyl-1α-bromo-1-deoxylincosamine,
N-acetyl-2,3,4,7-tetra-O-nonanoyl-1α-bromo-1-deoxylincosamine,
N-acetyl-2,3,4,7-tetra-O-decanoyl-1α-bromo-1-deoxylincosamine,
N-acetyl-2,3,4,7-tetra-O-undecanoyl-1α-bromo-1-deoxylincosamine,
N-acetyl-2,3,4,7-tetra-O-lauroyl-1α-bromo-1-deoxylincosamine,
N-acetyl-2,3,4,7-tetra-O-phenylacetyl-1α-bromo-1-deoxylincosamine,
N-acetyl-2,3,4,7-tetra-O-(3-phenylpropionyl)-1α-bromo-1-deoxylincosamine,
N-cyclopentanepropionyl-2,34,7-tetra-O-acetyl-1α-bromo-1-deoxylincosamine,
N-isovaleryl-2,3,4,7-tetra-O-octanoyl-1α-bromo-1-deoxylincosamine, and the like.

EXAMPLE 10.—METHYL N-ACETYL-2,3,4,7-TETRA-O-ACETYL-β-THIOLINCOSAMINIDE

Two grams of N-acetyl-2,3,4,7-tetra-O-acetyl-1α-bromo-1-deoxylincosamine was dissolved in 25 ml. of acetone which had been dried previously over potassium carbonate, and to this solution was added 350 mg. of thiourea. After warming briefly on a steam bath until the solids had dissolved, the colorless reaction mixture was left overnight at room temperature. To it was then added a solution of 680 mg. of potassium carbonate and 860 mg. of sodium bisulfite in 10 ml. of water, followed by 900 mg. (0.40 ml.) of methyl iodide. The mixture was kept in a stoppered bottle which was shaken mechanically at room temperature for 3 hours. The reaction mixture was then extracted thoroughly with chloroform, the combined extracts were washed twice with water, dried over anhydrous sodium sulfate, and the solvents were removed on a rotating evaporator at 40° C. and 15 mm. Hg pressure. In this manner 1.38 g. of colorless, amorphous solid was obtained, which upon thin-layer chromatography was shown to be a single compound. This solid was dissolved in hot ethyl acetate which was thereupon diluted with Skellysolve B hexanes to give 880 mg. of colorless platelets of melting point 268–272° C. Recrystallization from the same solvents gave methyl N-acetyl-2,3,4,7-tetra-O-acetyl-β-thiolincosaminide of melting point 272–273° C. and rotation $[\alpha]_D^{25}$ +31° (c., 0.6800, chloroform).

*Analysis.*—Calcd. for $C_{19}H_{29}NO_{10}S$: C, 49.22; H, 6.31; N, 3.02; S, 6.92. Found: C, 49.15; H, 6.23; N, 3.00; S, 6.41.

EXAMPLE 11.—METHYL N-ACETYL-2,3,4,7-TETRA-O-PROPIONYL-β-THIOLINCOSAMINIDE

In the manner given in Example 10, N-acetyl-2,3,4,7-tetra-O-propionyl-1α-bromo-1-deoxylincosamine was treated with thiourea and subsequently with aqueous potassium carbonate, sodium bisulfite and methyl iodide to give methyl N-acetyl-2,3,4,7-tetra-O-propionyl-β-thiolincosaminide.

EXAMPLE 12.—METHYL N-PROPIONYL-2,3,4,7-TETRA-O-VALERYL-β-THIOLINCOSAMINIDE

In the manner given in Example 10, N-propionyl-2,3,4,7-tetra-O-valeryl-1α-bromo-1-deoxylincosamine was treated with thiourea and subsequently with aqueous potassium carbonate, sodium bisulfite and methyl iodide to give methyl N-propionyl-2,3,4,7-tetra-O-valeryl-β-thiolincosaminide.

EXAMPLE 13.—METHYL N-LAUROYL-2,3,4,7-TETRA-O-BENZOYL-β-THIOLINCOSAMINIDE

In the manner given in Example 10, N-lauroyl-2,3,4,7-tetra-O-benzoyl-1α-bromo-1-deoxylincosamine was treated with thiourea and subsequently with aqueous potassium carbonate, sodium bisulfite, and methyl iodide to give methyl N-lauroyl-2,3,4,7-tetra-O-benzoyl-β-thiolincosaminide.

In the manner given in Example 10, other methyl N-acyl-2,3,4,7-tetra-O-acyl-β-thiolincosaminides can be produced by reacting other N-acyl-2,3,4,7-tetra-O-acyl-1α-bromo-1-deoxylincosamines with thiourea and subsequently with potassium or sodium carbonate, sodium bisulfite, and methyl iodide to give the corresponding methyl N-acyl-2,3,4,7-tetra-O-acyl-β-thiolincosaminide. Representative compounds thus obtained include:

methyl N-acetyl-2,3,4,7-tetra-O-hexanoyl-β-thiolincosaminide,
methyl N-acetyl-2,3,4,7-tetra-O-heptanoyl-β-thiolincosaminide,
methyl N-acetyl-2,3,4,7-tetra-O-octanoyl-β-thiolincosaminide,
methyl N-acetyl-2,3,4,7-tetra-O-nonanoyl-β-thiolincosaminide,
methyl N-acetyl-2,3,4,7-tetra-O-decanoyl-β-
methyl N-acetyl-2,3,4,7-tetra-O-undecanoyl-β-thiolincosaminide,
methyl N-acetyl-2,3,4,7-tetra-O-lauroyl-β-thiolincosaminide,
methyl N-acetyl-2,3,4,7-tetra-O-phenylacetyl-β-thiolincosaminide,
methyl N-acetyl-2,3,4,7-tetra-O-(3-phenylpropionyl)-β-thiolincosaminide,
methyl N-cyclopentanepropionyl-2,3,4,7-tetra-O-acetyl-β-thiolincosaminide,
methyl N-isovaleryl-2,3,4,7-tetra-O-octanoyl-β-thiolincosaminide, and the like.

EXAMPLE 14.—METHYL N-ACETYL-β-THIOLINCOSAMINIDE

Ten ml. of methanol was saturated with dry ammonia gas at a temperature between 0 and 5° C. Into this saturated solution was added at room temperature 1 g. of methyl N-acetyl-2,3,4,7-tetra-O-acetyl-β-thiolincosaminide. The mixture was allowed to stand at room temperature for three hours and then taken to dryness on a rotating evaporator at 40° C. and 15 mm. Hg pressure, and the solid thus obtained was recrystallized three times from ethanol to give methyl N-acetyl-β-thiolincosaminide.

EXAMPLE 15.—METHYL N-PROPIONYL-β-THIOLINCOSAMINIDE

In the manner given in Example 14, methyl N-propionyl-2,3,4,7-tetra-O-valeryl-β-thiolincosaminide was treated with a saturated solution of gaseous ammonia in methanol to give methyl N-propionyl-β-thiolincosaminide.

EXAMPLE 16.—METHYL N-LAUROYL-β-THIOLINCOSAMINIDE

In the manner given in Example 14, methyl N-lauroyl-2,3,4,7-tetra-O-benzoyl - β - thiolincosaminide was treated with a saturated solution of gaseous ammonia in ethanol to give methyl N-lauroyl-β-thiolincosaminide.

In the manner given in Example 14, other methyl N-acyl-β-thiolincosaminides are obtained by treating other methyl N-acyl - 2,3,4,7-tetra-O-acyl-β-thiolincosaminides in methyl, ethyl, propyl, butyl, pentyl, or hexyl alcohols in the presence of ammonia. Representative compounds thus obtained include: methyl N-butyryl-β-thiolincosaminide, methyl N-valeryl-β-thiolincosaminide, methyl N-hexanoyl - β-thiolincosaminide, methyl N-heptanoyl-β-thiolincosaminide, methyl N-octanoyl-β-thiolincosaminide, methyl N-nonanoyl-β-thiolincosaminide, methyl N-decanoyl - β-thiolincosaminide, methyl N-undecanoyl-β-thiolincosaminide, methyl N-phenylacetyl - β-thiolincosaminide, methyl N-phenylpropionyl-β-thiolincosaminide, and the like.

EXAMPLE 17.—METHYL β-THIOLINCOSAMINIDE

A solution of 1 g. methyl N-acetyl-β-thiolincosami- in 10 ml. of hydrazine hydrate was refluxed for 24 hours. Excess hydrazine was then removed in a stream of dry nitrogen on a steam bath. The crystalline residue was recrystallized from 5 ml. of water, the crystals were collected, washed with cold water, and dried in vacuo to give methyl β-thiolincosaminide (VIIa).

EXAMPLE 18.—N-ACETYL - 3,4 - O - ISOPROPYLIDENE - 7 - O - METHYL - 1,5-ANHYDROLINCOSAMINOL (IXb)

A suspension of 5.3 g. of finely-powdered methyl N-acetyl-b-thiolincosaminide was stirred for 30 minutes at room temperature with 500 ml. of acetone and 5 ml. of concentrated sulfuric acid. After 30 minutes another 5 ml. of concentrated sulfuric acid was added, and the solution was stirred for another half hour at room temperature. A suspension of 150 g. of barium carbonate in 100 ml. of water was added, and the mixture was stirred until neutral. The barium sulfate and excess carbonate were removed by filtration and the precipitate was washed with acetone. The filtrate and washings were combined and evaporated to dryness in vacuo at 40° C. The residue was treated with acetone:ether (10:1) and insoluble materials were removed by filtration. The filtrate was evaporated to dryness and the residue was dissolved in 100 ml. of ethanol. Removal of the alcohol by heating in vacuo left a gummy material which was dissolved in 20 ml. of warm water containing a small amount of sodium carbonate. After removal of some insoluble material by filtration, the filtrate was cooled. The crystals which formed were collected after standing in the refrigerator for 4 hours, washed with cold water, and dried in vacuo, to give methyl N-acetyl-3,4-O-isopropylidene-β-thiolincosaminide (VIIIa).

Five grams of methyl N-acetyl-3,4-O-isopropylidene-β-thiolincosaminide was heated under reflux for 7 hours with 35 ml. of loosely-packed Raney nickel in 150 ml. of ethanol. The mixture was thereupon filtered and the catalyst was washed with a total of 400 ml. of boiling ethanol. The filtrate and washings were combined and evaporated to dryness, leaving a partially crystalline residue. This residue was purified by counter current distribution in a system of 1-butanol:water to give N-acetyl-3,4-O-isopropylidene - 1-deoxylincosamine [N-acetyl-3,4-O-isopropylidene-1,5-anhydrolincosaminol (IXa)].

Potassium metal (1.16 g.) was dissolved in 100 ml. of tert-butyl alcohol. The solvent was removed as completely as possible by distillation at atmospheric pressure and finally by vacuum distillation at 15 mm. Hg pressure. To the dry solid residue was added 100 ml. of dry benzene and the benzene was removed by distillation to leave a fine powder. To the thus-obtained powdery potassium tert-butoxide was added 200 ml. of dry benzene, and the mixture was stirred magnetically at room temperature until an opalescent solution resulted. To this solution was added 5 g. of N-acetyl-3,4-O-isopropylidene-1-deoxylincosamine (IX) and the mixture was then stirred overnight at room temperature. To this mixture was added 42.4 g. (18.6 ml.) of methyl iodide and the mixture was stirred at room temperature for 2 hours. The mixture was filtered to remove potassium iodide, and the filtrate was distilled in vacuum at about 35° C. to give a colorless syrupy material, which was subjected to counter current distribution in a system of ethyl acetate:ethanol:water in a ratio of 4:1:2. The fractions containing N-acetyl-3,4-O-isopropylidene-7-O-methyl-1,5-anhydrolincosaminol, as determined by thin-layer chromatography, were combined, evaporated to dryness and the residue was crystallized to give pure N-acetyl-3,4-O-isopropylidene - 7-O-methyl - 1,5-anhydrolincosaminol (IXb).

In the manner given in Example 18, N-propionyl-, N-butyryl-, N-valeryl-, N-hexanoyl-, N-heptanoyl-, N-octanoyl-, N-nonanoyl-, N-decanoyl-, and N-lauroyl-3,4-O-isopropylidene-7-O-methyl-1,5-anhydrolincosaminol can be synthesized by substituting methyl N-acetyl-β-thiolincosaminide by another methyl N-acyl-β-thiolincosaminide, wherein the acyl group has from 2 to 12 carbon atoms, inclusive.

The thus-produced N-acyl - 3,4-O-isopropylidene-7-O-methyl-1,5-anhydrol lincosaminols are anti-fungal agents, which are active against *Trichophyton rubrum* and *Pseudomonas fluorescens*.

EXAMPLE 19.—N-ACETYL-3,4-O-ISOPROPYLIDENE-1-DEOXYCELESTOSAMINE

A. 2-hydroxyethyl 1-α-thiocelestosaminide hydrazine solvate

A mixture of 5 gm. (0.0094 mole) of celesticetin (Example 3, U.S. Patent 2,928,844) and 25 ml. (excess) of hydrazine hydrate was heated under reflux for 21 hours. The excess hydrazine was removed by distillation in vacuo and the residue was crystallized from 35 ml. of absolute ethanol. White crystals (1.2 gm.) of 2-hydroxyethyl thiocelestosaminide hydrazine solvate were obtained which melted at 98–108° C. Recrystallization from absolute ethanol gave 0.65 gm. having an optical rotation of $[\alpha]_D^{25}$ +243° (c.=0.8, water); an infrared absorption spectrum in Nujol mull at the following frequencies: 3400, 1630, 1600, 1460, 1450 (sh.), 1305, 1275, 1260, 1200, 1115, 1085, 1055, 1010, 978, 950, 925, 910, 873, 800–820, 705, 690, and 680 $cm.^{-1}$; an equivalent weight of 161 with two basic groups having pKa's in the region of 7.5; and the following elemental analysis.

*Analysis.*—Calcd. for $C_{11}H_{23}NO_6S \cdot N_2H_4$: C, 40.11; H, 8.26; N, 12.76; S, 9.74. Found: C, 40.15; H, 8.04; N, 11.69; S, 9.56.

B. 2-hydroxyethyl-1-α-thiocelestosaminide hydrazine solvate

Desalicetin (Example I, U.S. Patent 2,851,463) (10 gm.) was dissolved in hydrazine hydrate (100 cc.) and heated under reflux in an oil bath at 165° C. for 18 hours. The almost colorless solution was concentrated to dryness on a steam bath, first at fifteen mm. and finally at less than 1 mm., giving a solid residue which was slurried with acetonitrile, filtered, and washed with the same solvent. Crystallization from ethanol gave colorless needles (2.64 gm.) of 2-hydroxyethyl thiocelestosaminide hydrazine solvate. Recrystallization from the same solvent gave crystals of 2-hydroxyethyl thiocelestosaminide hydrazine solvate which had an equivalent weight of 168 with two basic groups having pKa's in the region of 7.5; an optical notation of $[\alpha]_D^{25}$ +248° (c.=1, 95% ethanol); and the following elemental analysis.

*Analysis.*—Calcd. for $C_{11}H_{23}NO_6S \cdot N_2H_4$: C, 40.11; H, 8.26; N, 12.76; S, 9.74. Found: C, 40.27; H, 7.95; N, 11.63; S, 9.80.

The IR spectrum showed identity of this product with that obtained in Preparation 1.

C. *2-hydroxyethyl-1-α-thiocelestosaminide*

A solution of 2 gm. of 2-hydroxyethyl thiocelestosaminide hydrazine solvate in 30 ml. of dimethylformamide was concentrated to a volume of about 10 ml. and then diluted with 10 ml. of dimethylformamide. Ether was added until cloudiness resulted, and 500 mg. of 2-hydroxyethyl thiocelestosaminide was deposited. The crystalline 2-hydroxyethyl thiocelestosaminide had an optical rotation of $[\alpha]_D^{25}$ +262° (c.=1, in water); an infrared absorption spectrum at the following frequencies: 3400 (sh.), 3250, 1600, 1400, 1325, 1310, 1290, 1240, 1195, 1160, 1150 (sh.), 1110, 1100, 1075, 1045, 1038, 1005, 980, 920, 895, 862, 825, 796, 740, 711, and 690 cm.$^{-1}$; an equivalent weight of 297; pKa' of 7.2; and the following elemental analysis.

*Analysis.*—Calcd. for $C_{11}H_{23}NO_6S$: C, 44.43; H, 7.80; N, 4.71; S, 10.78. C, 44.20; H, 7.78; N, 4.97; S, 10.68.

D. *2-hydroxyethyl N-acetyl-1-α-thiocelestosaminide*

A suspension of 10 gm. of 2-hydroxyethyl 1-α-thiocelestosaminide in 100 ml. of methanol was stirred magnetically and thereto was added 6.8 gm. of acetic anhydride. The solid dissolved at once, and the solution was allowed to stand over night at room temperature (22–26° C.).

Removal of the solvent on a rotating evaporator at 30° C. (15 mm. Hg) gave a colorless oil, which could not be induced to crystallize and was used in this form for subsequent reaction without further purification.

E. *N-acetyl-1,2,3,4-tetra-O-acetyl-α-celestosamine and -β-celestosamine*

A solution of 11.3 gm. of 2-hydroxyethyl N-acetyl-1-α-thiocelestosaminide in 400 ml. of water was stirred magnetically at 24° C. This solution was added to a solution of mercuric chloride (13.65 gms.) in 400 ml. of water with continued stirring. The solution became opaque and the solid ($ClHgSCH_2CH_2OH$) was removed by filtration after 20 hours and washed with water. The stirred, combined filtrate and washings were treated dropwise with pyridine until no further precipitation of the crystalline mercuric chloride-pyridine complex occurred. After refrigeration for one hour, the solids were removed by filtration, washed with water and the combined filtrate and washings stirred with an excess of silver acetate for one hour to remove chloride ions. Filtrate and washings were combined to give a colorless liquid from which silver ions were removed by saturating it with hydrogen sulfide. The silver sulfide was removed by filtration through a millipore disk and washed with water. Lyophilization of the combined filtrate and washings gave a colorless amorphous solid, a mixture of the anomeric forms of N-acetylcelestosamine, which was acetylated by dissolving it in pyridine (100 ml.), adding 50 ml. of acetic anhydride and letting the mixture stand over night.

The solvent was removed on a rotating evaporator at 35° and 15 mm. and finally at less than 1 mm. Hg and the resulting residue dissolved in a mixture of chloroform and water. The aqueous layer was extracted twice with chloroform, and the combined chloroform extracts washed with dilute hydrochloric acid, twice with water, with saturated aqueous sodium bicarbonate, again twice with water and then dried over anhydrous sodium sulfate. After removal of the solvent on a rotating evaporator at 30° and 15 mm. Hg an amorphous solid was obtained which, when crystallized from ethyl acetate-Skellysolve B hexanes gave 5.8 gm. of colorless elongated prisms of N-acetyl-1,2,3,4-tetra-O-acetyl-β-celestosamine of melting point 236 to 238° C.

*Analysis.*—Calcd. for $C_{19}H_{29}O_{11}N$: C, 51.00; H, 6.53; N, 3.13; OMe, 6.94; acetyl, 48.10. Found: C, 51.34; H, 6.69; N, 3.06; OMe, 7.30; acetyl, 44.36. M. Wt. 441; $[\alpha]_D^{25}$ +30° (c. 0.729, $CHCl_3$).

I.R.: NH at 3380, C=O at 1760, 1745; amide II at 1680; NH deformation at 1230, 1215; C—O/C—N at 1125, 1085, 1055 cm.$^{-1}$.

Evaporating the mother liquor of the ethyl acetate-Skellysolve B-hexanes crystallization gave a solid, which was redissolved in ethyl acetate and thus chromatographed as a silica gel column with a gradient elution of ethyl acetate and increasing amounts of cyclohexane. The first fractions, containing some N-acetyl-1,2,3,4-tetra-O-acetyl-β-celestosamine were discarded and the later fractions containing mostly the α-anomer were combined, evaporated and several times recrystallized to give N-acetyl-1,2,3,4-tetra-O-acetyl-α-celestosamine.

F. *N-acetyl-2,3,4-tri-O-acetyl-1-α-bromo-1-deoxycelestosamine*

In the manner given in Example 5, 2 gm. of N-acetyl-1,2,3,4-tetra-O-acetyl-β-celestosamine was stirred with a solution of anhydrous hydrogen bromide in acetic acid at room temperature to give N-acetyl-2,3,4,-tri-O-acetyl-1-α-bromo-1-deoxycelestosamine.

G. *Methyl N-acetyl-2,3,4-tri-O-acetyl-β-thiocelestosaminide*

In the manner given in Example 10, N-acetyl-2,3,4-tri-O-acetyl-1-α-bromo - 1 - deoxycelestosamine, dissolved in acetone, was treated with thiourea and thereupon with potassium carbonate and sodium bisulfite followed by methyl iodide to give methyl N-acetyl-2,3,4-tri-O-acetyl-β-thiocelestosaminide.

H. *Methyl N-acetyl-β-thiocelestosaminide*

In the manner given in Example 14, methyl N-acetyl-2,3,4-tri-O-acetyl-β-thiocelestosaminide was treated at room temperature with a solution of ammonia in methanol to give methyl N-acetyl-β-thiocelestosaminide.

I. *Methyl β-thiocelestosaminide*

In the manner given in Example 17, methyl N-acetyl-β-thiocelestosaminide was refluxed with hydrazine hydrate in a nitrogen atmosphere to give methyl β-thiocelestosaminide.

J. *N-acetyl-3,4-O-isopropylidene-1-deoxycelestosamine*

In the manner given in Example 18, methyl N-acetyl-β-thiocelestosaminide was treated with acetone and a catalytic amount (about 2% by weight of the acetone) of concentrated sulfuric acid to give methyl N-acetyl-3,4-O-isopropylidine-β-thiocelestosaminide.

The thus-obtained methyl N-acetyl-3,4-O-isopropylidine-β-thiocelestosaminide was heated with Raney nickel in ethanol (as in Example 18) to give N-acetyl-3,4-O-isopropylidine-1-deoxycelestosamine.

In the manner given in Example 19–D treating methyl 1-α-thiocelestosaminide with other acid anhydrides such as propionic, butyric, valeric, hexanoic, octanoic, lauric, gives the corresponding N-propionyl-, N-butyryl-, N- valeryl-, N-hexanoyl-, N-octanoyl-, or N-lauroyl-1-α-thiocelestosaminide.

Treating the thus-obtained N-acyl-1-α-thiocelestosaminides with mercuric chloride in hot water furnishes the corresponding celestosamines such as N-propionyl-, N-butyryl-, N-valeryl-, N-hexanoyl-, N-octanoyl-, N-lauroyl-α and -β-celestosamine.

Treating such celestosamines with acid anhydrides in pyridine results in the corresponding N-acyl-1,2,3,4-tetra-O-acyl-α- and β-celestosamine, such as, for example N-acetyl-1,2,3,4-tetra-O-propionyl-α- and β-celestosamine; N - valeryl - 1,2,3,4 - tetra - O - propionyl - α - and β-celestosamine; N-hexanoyl-1,2,3,4-tetra-O-hexanoyl-α- and β-celestosamine; N-octanoyl-1,2,3,4-tetra-O-hexanoyl-α- and β-celestosamine; N-butyryl-1,2,3,4-tetra-O-lauroyl-α- and β-celestosamine, and the like.

Treatment of such celestosamine esters with hydrogen bromide and acetic acid results in the corresponding N-acyl - 2,3,4, - tri - O - acyl - 1 - α - bromo - 1 - deoxycelestosamines, such as, for example, N-acetyl-2,3,4-tri-O-propionyl-1-α-bromo-1-deoxycelestosamine; N-butyryl-2,3,4, - tri - O - propionyl - 1 - α - bromo - 1 - deoxycelestosamine; N-valeryl-2,3,4-tri-O-hexanoyl-1-α-bromo-1-deoxycelestosamine; N-hexanoyl-2,3,4-tri-O-octanoyl-1-α-bromo-1-deoxycelestosamine; N-lauroyl-2,3,4-tri-O-propionyl-1-α-bromo-1-deoxycelestosamine, and the like.

These compounds with thiourea, potassium carbonate, sodium bisulfate and methyl iodide, as in Example 10, can be converted to the corresponding methyl N-acyl-2,3,4,-tri-O-acyl-β-thiocelestosaminides, such as, for example, methyl N-acetyl-2,3,4-tri-O-propionyl-β-thiocelestosaminide; methyl N-propionyl-2,3,4-tri-O-butyryl-β-thiocelestosaminide; methyl N-butyryl-2,3,4-tri-O-hexanoyl-β-thiocelestosaminide; methyl N-hexanoyl-2,3,4-tri-O-octanoyl-β-thiocelestosaminide; methyl N-lauroyl-2,3,4-tri-O-octanoyl-β-thiocelestosaminide and the like.

Treatment of the above listed thiocelestosaminides with ammonia, dissolved in methanol, or ammonia, dissolved in ethanol, yields the corresponding methyl N-acyl-β-thiocelestosaminide, such as methyl N-propionyl-β-thiocelestosaminide; methyl N-propionyl-β-thiocelestosaminide; methyl N-butyryl-β-thiocelestosaminide; methyl N-valeryl-β-thiocelestosaminide; methyl N-hexanoyl-β-thiocelestosaminide; methyl N-octanoyl-β-thiocelestosaminide; methyl N-lauroyl-β-thiocelestosaminide, and the like.

Treatment of these methyl N-acyl-β-thiocelestosaminide with Raney nickel in a lower alkanol such as methanol, ethanol, propanol, gives methyl β-thiocelestosaminide.

I claim:

1. A compound of the formula

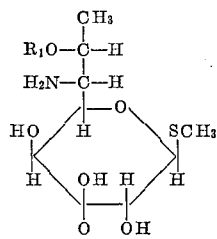

wherein R₁ is selected from the group consisting of hydrogen and methyl.

2. Methyl β-thiolincosaminide.
3. Methyl β-thiocelestosaminide.
4. A methyl N-acyl-β-thiolincosaminide wherein the acyl group is that of a hydrocarbon carboxylic acid having from 2 to 12 carbons, inclusive.
5. Methyl N-acetyl-β-thiolincosaminide.
6. A methyl N-acyl-β-thiocelestosaminide wherein the acyl group is that of a hydrocarbon carboxylic acid having from 2 to 12 carbon atoms, inclusive.
7. Methyl N-acetyl-β-thiocelestosaminide.

8. A compound of the formula

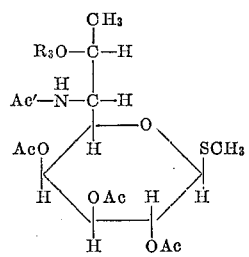

wherein Ac and Ac' are the acyl radicals of hydrocarbon carboxylic acids containing from 2 to 12 carbon atoms, inclusive, and wherein R₃ is selected from the group consisting of methyl and Ac, defined as above.

9. Methyl N-acetyl-2,3,4,7-tetra-O-acetyl-β-thiolincosaminide.
10. Methyl N-acetyl - 2,3,4-tri-O-acetyl-β-thiocelestosaminide.
11. A compound of the formula

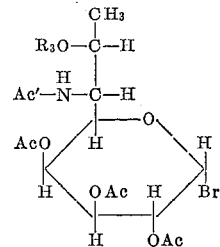

wherein Ac and Ac' are the acyl radicals of hydrocarbon carboxylic acids containing from 2 to 12 carbon atoms, inclusive, and wherein R₃ is selected from the group consisting of methyl and Ac, defined as above.

12. N-acetyl-2,3,4,7-tetra - O - acetyl - 1α - bromo-1-deoxylincosamine.
13. N - acetyl - 2,3,4-tri-O-acetyl - 1α - bromo-1-deoxycelestosamine.
14. A compound of the formula

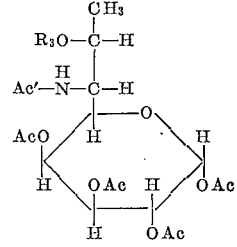

wherein Ac and Ac' are the acyl radicals of hydrocarbon carboxylic acids containing from 2 to 12 carbon atoms, inclusive, and wherein R₃ is selected from the group consisting of methyl and Ac, defined as above.

15. N-acetyl-1,2,3,4,7-penta-O-acetyl-α-lincosamine.
16. N-acetyl-1,2,3,4,-tetra-O-acetyl-α-celestosamine.
17. A compound of the formula

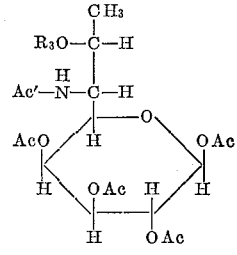

wherein Ac and Ac' are the acyl radicals of hydrocarbon carboxylic acids containing from 2 to 12 carbon atoms, inclusive, and wherein R₃ is selected from the group consisting of methyl and Ac, defined as above.

18. N-acetyl-1,2,3,4,7-penta-O-acetyl-β-lincosamine.
19. N-acetyl-1,2,3,4-tetra-O-acetyl-β-celestosamine.

20. A process for the production of a compound of the formula

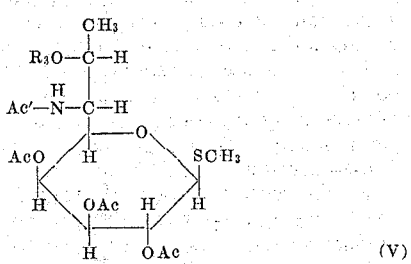

wherein Ac and Ac' are the acyl radicals of hydrocarbon carboxylic acids containing from 2 to 12 carbon atoms, inclusive, and wherein $R_3$ is selected from the group consisting of methyl and Ac, defined as above, which comprises: treating a compound of the formula

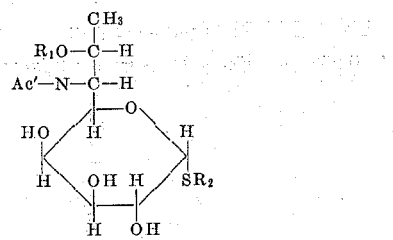

wherein Ac' is defined as hereinbefore, wherein $R_1$ is selected from the group consisting of hydrogen and methyl, wherein $R_2$ is selected from the group consisting of methyl and 2-hydroxyethyl with aqueous mercuric chloride to obtain a mixture selected from the group consisting of N-acyl-α-lincosamine and N-acyl-β-lincosamine and N-acyl-α-celestosamine and N-acyl-β-celestosamine; acylating this mixture with an acylating agent selected from the group consisting of acyl halides and acid anhydrides of hydrocarbon carboxylic acids containing from 2 to 12 carbon atoms, inclusive, to obtain a mixture selected from the group consisting of N-acyl-1,2,3,4,7-penta-O-acyl-α-lincosamine and N-acyl-1,2,3,4,7-penta-O-acyl-β-lincosamine, and N-acyl-1,2,3,4-tetra-O-acyl-α-celestosamine and N-acyl-1,2,3,4-tetra-O-acyl-β-celestosamine; treating a thus-obtained mixture with hydrogen bromide in acetic acid to obtain the corresponding compound of the formula

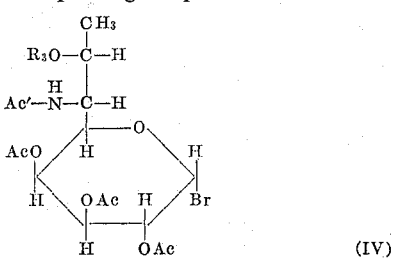

wherein Ac, and Ac' and $R_3$ are defined as hereinabove, and treating the bromo compound with thiourea and subsequently with potassium carbonate, sodium bisulfite, and methyl iodide to obtain the compound of Formula V above.

21. A process for the production of methyl N-acetyl-2,3,4,7-tetra-O-acetyl-β-thiolincosaminide, which comprises: treating methyl N-acetyl-α-thiolincosaminide of the formula

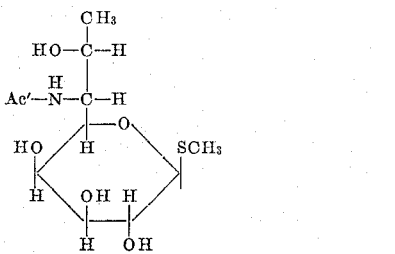

wherein Ac' is acetyl, with aqueous mercuric chloride to obtain a mixture of N-acetyl-α-lincosamine and N-acetyl-β-lincosamine; acetylating this mixture with acetic anhydride to obtain N - acetyl-1,2,3,4,7-penta-O-acetyl-α-lincosamine and N-acetyl-1,2,3,4,7-penta-O-acetyl-β-lincosamine; treating N-acetyl-1,2,3,4,7-penta-O-acetyl-β-lincosamine with hydrogen bromide in acetic acid to obtain N-acetyl-2,3,4,7-tetra-O-acetyl-1α-bromo-1-deoxylincosamine and treating this bromo compound with thiourea and subsequently with potassium carbonate, sodium bisulfite and methyl iodide to obtain methyl N-acetyl-2,3,4,7-tetra-O-acetyl-β-thiolincosaminide.

22. A process for the production of methyl N-acetyl-2,3,4-tri-O-acetyl-α-thiocelestosaminide, which comprises: treating 2-hydroxyethyl N-acetyl-α-thiocelestosaminide of the formula

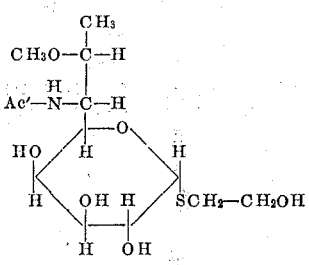

wherein Ac' is acetyl, with aqueous mercuric chloride to obtain a mixture of N-acetyl-α-celestosamine and N-acetyl-β-celestosamine; acetylating this mixture with acetic anhydride to obtain N-acetyl-1,2,3,4-tetra-O-acetyl-α-celestosamine and N-acetyl-1,2,3,4-tetra-O-acetyl-β-celestosamine; treating N-acetyl-1,2,3,4-tetra-O-acetyl-β-celestosamine with hydrogen bromide in acetic acid to obtain N-acetyl - 2,3,4-tri-O-acetyl-1-α-bromo-1-deoxycelestosamine and treating this bromo compound with thiourea and subsequently with potassium carbonate, sodium bisulfite and methyl iodide to obtain methyl N-acetyl-2,3,4-tri-O-acetyl-β-thiocelestosaminide.

23. A process for the production of a compound of the formula

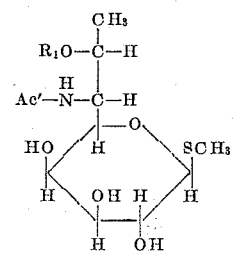

wherein Ac' is the acyl radical of a hydrocarbon carboxylic acid containing from 2 to 12 carbon atoms, inclusive, and wherein $R_1$ is selected from the group consisting of hydrogen and methyl, which comprises: treating a compound of the formula

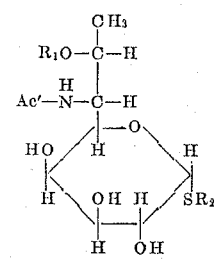

wherein Ac' and $R_1$ are defined as hereinbefore, and wherein $R_2$ is selected from the group consisting of methyl and 2-hydroxyethyl with aqueous mercuric chloride to obtain a mixture selected from the group consisting of the corresponding N-acyl-α-lincosamine and N-acyl-β-lincosamine and N-acyl-α-celestosamine and N-acyl-β-celestosamine, acylating this mixture with an acylating agent selected from the group consisting of acyl halides and acid anhydrides of hydrocarbon carboxylic acids containing from 2 to 12 carbon atoms, inclusive, to obtain a mixture selected from the group of the corresponding N-acyl-1,2,3,4,7-penta-O-acyl-α-lincosamine and -β-lincosamine and N-acyl-1,2,3,4-tetra-O-acyl-α-celestosamine and -β-celestosamine; treating the thus-defined mixture with hydrogen bromide in acetic acid to obtain a compound of the formula

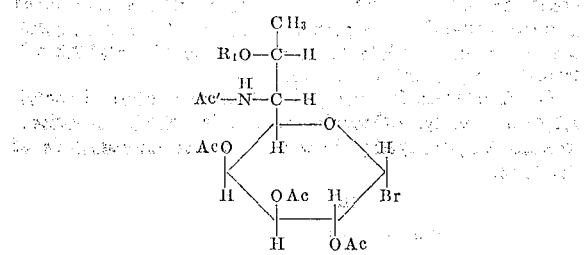

wherein Ac, Ac' and R₁ are defined as hereinabove, and treating said bromo compound with thiourea and subsequently with potassium carbonate, sodium bisulfite and methyl iodide to obtain the corresponding compound selected from the group consisting of methyl N-acyl-2,3,4,7-tetra-O-acyl-β-thiolincosaminide and methyl N-acyl-2,3,4-tri-O-acyl-β-thiocelestosaminide; and treating this compound with ammonia in a lower alkanol to obtain the corresponding compound selected from the group consisting of methyl N-acyl-β-thiolincosaminide and methyl N-acyl-β-thiocelestosaminide.

24. The process of claim 23, wherein the starting material is methyl N-acyl-α-thiolincosaminide and the end product is methyl N-acetyl-β-thiolincosaminide.

25. The process of claim 23, wherein the starting material is methyl N-acetyl-α-thiocelestosaminide and the end product is methyl N-acetyl-β-thiocelestosaminide.

No references cited.

LEWIS GOTTS, *Primary Examiner.*

JOHNIE R. BROWN, *Assistant Examiner.*